US012258025B2

(12) United States Patent
Lynam (10) Patent No.: US 12,258,025 B2
(45) Date of Patent: Mar. 25, 2025

(54) VEHICULAR DRIVER MONITORING SYSTEM WITH EVENT CAMERA

(71) Applicant: Magna Electronics Inc., Auburn Hills, MI (US)

(72) Inventor: Niall R. Lynam, Holland, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 282 days.

(21) Appl. No.: 18/162,765

(22) Filed: Feb. 1, 2023

(65) Prior Publication Data

US 2023/0242123 A1 Aug. 3, 2023

Related U.S. Application Data (60) Provisional application No. 63/267,399, filed on Feb. 1, 2022.

(51) Int. Cl.
*B60W 40/08* (2012.01)
*B60R 1/08* (2006.01)
(Continued)

(52) U.S. Cl.
CPC ............... *B60W 40/08* (2013.01); *B60R 1/08* (2013.01); *B60R 1/29* (2022.01); *B60W 30/09* (2013.01);
(Continued)

(58) Field of Classification Search
CPC ...... B60W 40/08; B60W 30/09; B60W 50/14; B60W 2420/403; B60W 2540/229;
(Continued)

(56) References Cited

U.S. PATENT DOCUMENTS 7,038,577 B2 5/2006 Pawlicki et al.
7,720,580 B2 5/2010 Higgins-Luthman
(Continued)

FOREIGN PATENT DOCUMENTS

EP 3393122 A1 10/2018
WO 2019067731 A1 4/2019

OTHER PUBLICATIONS

Scheerlinck, C., Rebecq, H., Gehrig, D., Barnes, N., Mahony, R. and Scaramuzza, D., 2020, "Fast image reconstruction with an event camera", in IEEE Winter Conference on Applications of Computer Vision (pp. 156-163).
(Continued)

*Primary Examiner* — Abdalla A Khaled
(74) *Attorney, Agent, or Firm* — HONIGMAN LLP (57) ABSTRACT

A vehicular driver monitoring system includes an event camera disposed in a cabin of a vehicle and viewing the head of a driver of the vehicle. The dynamic range of the event camera is at least 100 dB. The response time of the event camera is less than 10,000 microseconds. The event camera has a quantum efficiency of at least 15% for near-infrared light having a wavelength of 940 nm. The system, responsive to processing of data output by the event camera, monitors the driver of the vehicle. Responsive at least in part (a) to monitoring of the driver of the vehicle and (b) to vehicle kinematic data provided to the ECU, at least one selected from the group consisting of (i) a driver attentiveness alert is generated, (ii) a driver drowsiness alert is generated, (iii) steering of the vehicle is controlled and (iv) braking of the vehicle is controlled.

36 Claims, 4 Drawing Sheets (51) Int. Cl.
  *B60R 1/29* (2022.01)
  *B60W 30/09* (2012.01)
  *B60W 50/14* (2020.01)
  *G06V 20/59* (2022.01)

(52) U.S. Cl.
  CPC .......... *B60W 50/14* (2013.01); *G06V 20/597* (2022.01); *B60W 2420/403* (2013.01); *B60W 2540/229* (2020.02)

(58) Field of Classification Search
  CPC ... B60W 2040/0827; B60W 2420/408; B60W 2540/223; B60W 10/18; B60W 10/20; B60W 2050/143; B60W 2050/146; B60W 2556/35; B60R 1/08; B60R 1/29; G06V 20/597; G06V 10/143
  See application file for complete search history.

(56) References Cited

U.S. PATENT DOCUMENTS

| | | |
|---|---|---|
| 7,855,755 B2 | 12/2010 | Weller et al. |
| 7,914,187 B2 | 3/2011 | Higgins-Luthman et al. |
| 9,405,120 B2 | 8/2016 | Graf et al. |
| 9,843,777 B2 | 12/2017 | Schofield et al. |
| 10,017,114 B2 | 7/2018 | Bongwald |
| 10,046,706 B2 | 8/2018 | Larson et al. |
| 10,065,574 B2 | 9/2018 | Tiryaki |
| 10,237,481 B2 | 3/2019 | Newcombe et al. |
| 10,442,360 B2 | 10/2019 | LaCross et al. |
| 10,447,920 B2 | 10/2019 | Horesh |
| 10,466,779 B1 | 11/2019 | Liu |
| 10,670,713 B2 | 6/2020 | Lynam |
| 10,773,724 B2 | 9/2020 | DeWard et al. |
| 10,839,233 B2 | 11/2020 | Lynam et al. |
| 10,845,601 B1 | 11/2020 | Meier |
| 10,877,147 B2 | 12/2020 | Lynam |
| 10,992,887 B2 | 4/2021 | Movshovich |
| 11,019,273 B2 | 5/2021 | Movshovich et al. |
| 11,150,469 B2 | 10/2021 | Petljanski et al. |
| 11,151,739 B2 | 10/2021 | Rebecq et al. |
| 11,155,210 B2 | 10/2021 | Karner et al. |
| 11,176,367 B1 | 11/2021 | Fix et al. |
| 11,190,715 B2 | 11/2021 | Movshovich |
| 11,202,041 B2* | 12/2021 | Kindo .................. H04N 7/188 |
| 11,205,083 B2 | 12/2021 | Lynam |
| 11,212,490 B2 | 12/2021 | Dellantoni et al. |
| 11,314,396 B2 | 4/2022 | Olson et al. |
| 11,348,374 B2 | 5/2022 | Kramer et al. |
| 11,507,184 B2 | 11/2022 | Connor et al. |
| 11,518,401 B2 | 12/2022 | Kulkarni |
| 11,639,134 B1 | 5/2023 | Huizen et al. |
| 11,780,372 B2 | 10/2023 | Sobecki et al. |
| 11,827,153 B2 | 11/2023 | Miller et al. |
| 11,873,007 B2* | 1/2024 | Tamori ............ B60W 30/18163 |
| 2005/0232469 A1* | 10/2005 | Schofield ............ B60W 30/143 382/104 |
| 2006/0208169 A1* | 9/2006 | Breed ..................... G01S 15/88 250/221 |
| 2007/0086624 A1* | 4/2007 | Breed ............... B60R 21/01552 382/104 |
| 2008/0144944 A1* | 6/2008 | Breed .................. G06V 40/103 382/224 |
| 2013/0229522 A1* | 9/2013 | Schofield .............. B60S 1/0822 348/148 |
| 2014/0336876 A1 | 11/2014 | Gieseke et al. |
| 2015/0009010 A1* | 1/2015 | Biemer ................... G06F 21/32 340/5.83 |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0166130 A1* | 6/2017 | Foote ..................... B62D 1/046 |
| 2017/0217367 A1 | 8/2017 | Pflug et al. |
| 2017/0274906 A1 | 9/2017 | Hassan et al. |
| 2018/0222414 A1 | 8/2018 | Ihlenburg et al. |
| 2018/0231976 A1 | 8/2018 | Singh |
| 2019/0118717 A1 | 4/2019 | Blank et al. |
| 2020/0143560 A1 | 5/2020 | Lu et al. |
| 2020/0202151 A1* | 6/2020 | Wacquant ............ G06V 40/103 |
| 2020/0284913 A1* | 9/2020 | Amelot ................. G01S 7/4808 |
| 2020/0320320 A1 | 10/2020 | Lynam |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1 | 9/2021 | Kasarla et al. |
| 2021/0323473 A1 | 10/2021 | Peterson et al. |
| 2021/0397861 A1 | 12/2021 | Elrasad et al. |
| 2022/0114818 A1 | 4/2022 | Lynam |
| 2022/0157083 A1 | 5/2022 | Jandhyala et al. |
| 2022/0270409 A1 | 8/2022 | Kramer et al. |
| 2022/0366707 A1* | 11/2022 | Kuehnle ............. G06V 20/597 |
| 2022/0377223 A1* | 11/2022 | Noble .................. G06V 10/141 |
| 2023/0004745 A1 | 1/2023 | Fulop et al. |
| 2023/0166660 A1* | 6/2023 | Baur ......................... B60R 1/12 |
| 2024/0064274 A1 | 2/2024 | Blank et al. |
| 2024/0067182 A1* | 2/2024 | Persson ................ G06V 10/25 |
| 2024/0280490 A1* | 8/2024 | Perry .................. G02B 21/0032 |

OTHER PUBLICATIONS

Rebecq et al., "High Speed and High Dynamic Range Video with an Event Camera" rXiv:1906.07165v1 [cs.CV], Jun. 15, 2019.

\* cited by examiner

VEHICULAR DRIVER MONITORING SYSTEM WITH EVENT CAMERA

CROSS REFERENCE TO RELATED APPLICATION

The present application claims the filing benefits of U.S. provisional application Ser. No. 63/267,399, filed Feb. 1, 2022, which is hereby incorporated herein by reference in its entirety.

FIELD OF THE INVENTION

The present invention relates generally to a vehicular driving assist system and, more particularly, to a vehicular driving assist system that utilizes one or more cameras at a vehicle.

BACKGROUND OF THE INVENTION

Use of conventional cameras in vehicle driving assist systems is common and known. Examples of such known systems are described in U.S. Pat. Nos. 11,212,490; 11,155,210; 10,877,147; 10,839,233; 10,773,724; 10,670,713 and 9,843,777, which are hereby incorporated herein by reference in their entireties.

SUMMARY OF THE INVENTION

A vehicle utilizes one or more vehicular event cameras to capture data representative of objects or scenes exterior (or interior) of the vehicle. The system preferably includes an electronic control unit (ECU) comprising circuitry and associated software, with the circuitry including a data processor for processing data output by the vehicular event camera(s). The system may determine, via processing at the ECU of data output by the vehicular event camera(s), presence of an object (e.g., a pedestrian or a bicyclist or a vehicle or a guardrail or a traffic sign or the like) in the field of view of the vehicular event camera, such as for a driving assist system of the vehicle.

For example, a vehicular driver monitoring system includes an event camera disposed in a cabin of a vehicle equipped with the vehicular driver monitoring system, the event camera viewing the head of a driver of the equipped vehicle. The event camera comprising a photosensing array having photosensor pixels arranged in rows and columns. The event camera outputs data responsive to changes in brightness at respective pixels of the photosensing array. The dynamic range of the event camera is at least 100 dB. The response time of the event camera is less than 10,000 microseconds. The event camera has a quantum efficiency (QE) of at least 15% for near-infrared (near-IR) light having a wavelength of 940 nm. An electronic control unit (ECU) comprises electronic circuitry and associated software, with the electronic circuitry of the ECU including a processor for processing data output by the event camera. The vehicular driver monitoring system, responsive to processing at the ECU of data output by the event camera, monitors the driver of the equipped vehicle. Vehicle kinematic data is provided to the ECU as the equipped vehicle is driven along a road. The vehicle kinematic data provided to the ECU comprises at least one selected from the group consisting of (i) speed data, (ii) steering angle data, (iii) yaw data, (iv) pitch data and (v) roll data. Responsive at least in part (a) to monitoring of the driver of the equipped vehicle and (b) to vehicle kinematic data provided to the ECU, at least one selected from the group consisting of (i) a driver attentiveness alert is generated, (ii) a driver drowsiness alert is generated, (iii) steering of the equipped vehicle is controlled and (iv) braking of the equipped vehicle is controlled.

These and other objectives, advantages, purposes and features of the present invention will become apparent upon review of the following specification in conjunction with the drawings.

DESCRIPTION OF THE PREFERRED EMBODIMENTS

A vehicular driving assist system and/or object detection system and/or alert system and/or collision avoidance system and/or autonomous driving system and/or semi-autonomous driving system operates to capture data representative of a scene exterior of the vehicle and may process the captured data to detect objects at or near the vehicle and in the predicted path of the vehicle, such as to assist a driver of the vehicle in maneuvering the vehicle in a forward or rearward direction, and/or to self-drive the equipped vehicle. The driving assist system includes a processor or processing system that is operable to receive data provided from one or more vehicular event cameras and to process the data for object detection or the like.

Figure 1:
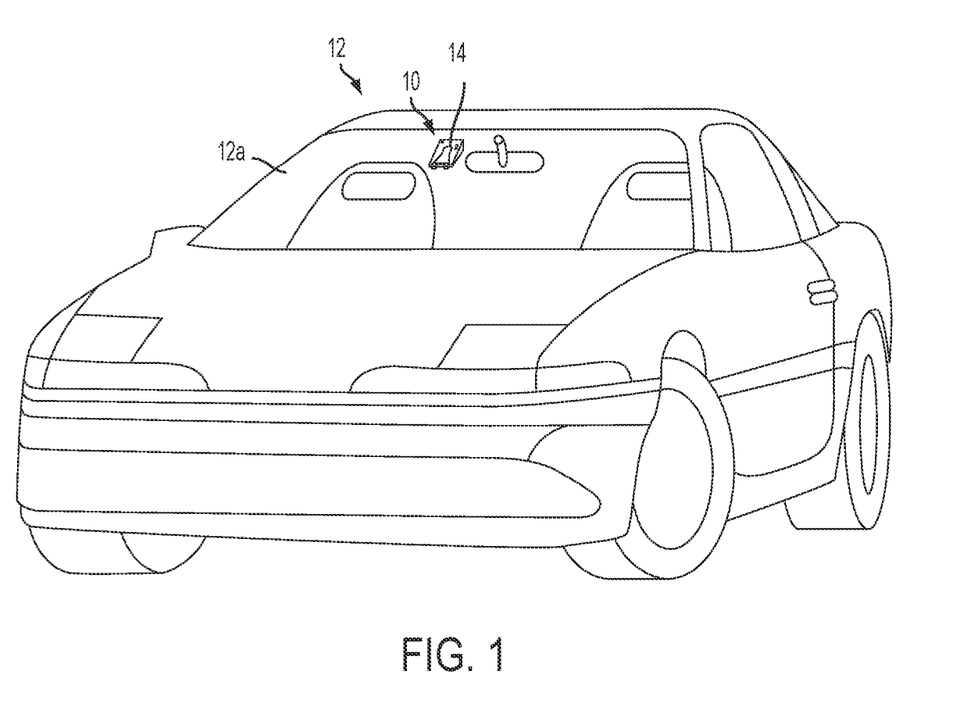
FIG. 1 is a perspective view of a vehicle with a driving assist system that incorporates at least one vehicular event camera.

Referring now to the drawings and the illustrative embodiments depicted therein, a vision system 10 for a vehicle 12 includes at least one exterior viewing vehicular event camera 14, such as a forward viewing vehicular event camera, which may be disposed at and behind the windshield 12a of the vehicle and viewing forward through the windshield so as to output data representative of changes in lighting intensity at individual pixels of the vehicular event camera (FIG. 1). Optionally, the system may include multiple exterior viewing event cameras, such as a forward viewing event camera at the front of the vehicle, and a sideward/rearward viewing event camera at respective sides of the vehicle, and a rearward viewing event camera at the rear of the vehicle, which capture data relating to objects and scenes present exterior of the vehicle. The vehicular event camera or event cameras each include a lens for focusing light at or onto a pixelated photosensor array of the event camera. The forward viewing vehicular event camera disposed at the windshield of the vehicle views through the windshield and forward of the vehicle, such as for a machine vision advanced driver assistance system (ADAS), such as for traffic sign recognition, headlamp control, pedestrian detection, collision avoidance, lane marker detection and/or the like. The vision system 10 includes a control or electronic control unit (ECU) having electronic circuitry and associated software, with the electronic circuitry including a data processor such as an image processor that is operable to process data output by the vehicular event camera or event cameras, whereby the ECU may detect or determine presence of objects or the like. The data transfer or signal communication from the vehicular event camera to the ECU may comprise any suitable data or communication link, such as a vehicle network bus or the like of the equipped vehicle.

The windshield-mounted vehicular event camera preferably is configured for an advanced driving assist system of the vehicle. The vehicular event camera comprises an event camera or neuromorphic event camera, silicon retina or dynamic vision sensor. The vehicular event camera comprises a pixelated sensor that responds to local changes in brightness at individual pixels of the pixelated sensor of event camera.

The vehicular event camera does not capture images or image data using a shutter as do conventional vehicular cameras. Instead, each photosensitive pixel of the multi-pixel array of the vehicular event camera operates independently and asynchronously, reporting changes in brightness as they occur, and staying silent otherwise. Modern event cameras have microsecond temporal resolution, 120 dB dynamic range, and less under/over exposure and motion blur than frame capturing cameras. An event camera comprises a dynamic vision sensor that in lieu of a shutter has each photosensing element of its photosensor array of photosensing elements outputting a signal whenever a threshold brightness change is observed, with an image reconstruction algorithm being used to generate an image from the signals output by the photosensor array of photosensing elements of the event camera, thus allowing the event camera be used for tracking without direct frame-by-frame image generation. Under illumination such as by near-infrared (near-IR) light, the pupil of a human eye exhibits a higher level of brightness than the surrounding features. Thus, by selecting an appropriate threshold brightness, the motion of the pupil would be tracked by an event camera by detecting reflections from the subject's eye(s) using an event camera and applying an image reconstruction algorithm to generate an image from signals output by photosensing elements of the event camera.

Exemplary image reconstruction algorithm/methodologies for generating an image from the signals output by the photosensor array of photosensing elements of an event camera include E2VID and Firenet image reconstruction algorithm/methodologies disclosed in Scheerlinck, C., Rebecq, H., Gehrig, D., Barnes, N., Mahony, R. and Scaramuzza, D., 2020, "Fast image reconstruction with an event camera", in IEEE Winter Conference on Applications of Computer Vision (pp. 156-163) (which is hereby incorporated herein by reference in its entirety), and in "High Speed and High Dynamic Range Video with an Event Camera", Henri Rebecq et al., IEEE TRANSACTIONS ON PATTERN ANALYSIS AND MACHINE INTELLIGENCE, VOL. 43, NO. 6, 2019 (which is hereby incorporated herein by reference in its entirety). Event cameras are suitable for integration with asynchronous computing architectures such as neuromorphic computing.

Thus, compared to video imaging with conventional cameras that uses a frame-based approach (in which all pixels in an image sensor measure light falling upon them for a given period of time and report their values to image processing circuitry in a synchronous manner), events are generated via an event camera as fast as the clock cycle for the image sensor, with the minimum period of time within which an event occurs being an event cycle. Event cameras therefore depart from standard fixed frame rate sampling cameras and measure brightness changes for each pixel independently. Instead of standard fixed frame rate sampling (as in non-event conventional video cameras), an event camera measures brightness changes for each pixel independently. Event cameras are novel sensors that report brightness changes in the form of a stream of asynchronous "events" instead of intensity frames. Event cameras do not use standard fixed frame rate sampling cameras and measure brightness changes for each pixel independently, naturally responding to edges in a scene and simplifying detection of lower level features such as key points and corners for object detection.

When used for vehicular driver monitoring systems (DMS) (such as a cabin monitoring event camera (e.g., a driver monitoring event camera and/or an occupant monitoring event camera), such as disposed at an interior rearview mirror assembly (as discussed in detail below)) to monitor a driver's face, facial features and or eyes, the high temporal resolution of event cameras enable low latency eye tracking, blink analysis and faster detection. The high dynamic range of an event camera (preferably greater than 100 dB, more preferably greater than 110 dB, and most preferably greater than 125 dB) facilitates accurate driver detection and eye monitoring under dynamic and extreme lighting conditions in a vehicular driver monitoring system. Event cameras report brightness changes in the form of a stream of asynchronous "events" instead of intensity frames, with advantages that include high temporal resolution, sub-millisecond latency, high dynamic range and reduced/no motion blur.

The vehicular event camera 14 includes photosensitive pixels that independently respond to changes in brightness as they occur. Each pixel of the vehicular event camera 14 stores a reference brightness level, and continuously compares it to the current level of brightness. If the difference in brightness exceeds a preset threshold, that pixel resets its reference level and generates an event: a discrete packet of information containing the pixel address and timestamp. The events may also contain the polarity (increase or decrease) of a brightness change, or an instantaneous measurement of the current level of illumination.

Thus, the vehicular event camera outputs an asynchronous stream of events triggered by changes in scene illumination. The vehicular event camera does not capture frames of image data, but provides an equivalent frame capture rate (as compared to a typical shutter-based conventional camera) of about 1,000,000 frames per second (as compared to about 30 fps or 60 fps of a known vehicular camera). The vehicular event camera provides a spatial resolution of about 0.1 to 0.2 Megapixels (MP), and operates with a power consumption of around 30 mW.

Unlike a conventional camera that captures multiple frames of image data every second (such as 30 frames/second), the vehicular event camera does not activate all the pixels simultaneously. The pixels respond only when the nature of the incoming light changes.

The vehicular event camera 14, such as a forward viewing vehicular event camera viewing through the front windshield of the equipped vehicle, moves in tandem with movement of that vehicle when that vehicle is being driven. Thus, as the vehicle moves, so does the vehicular event camera and thus incoming light from within the field of view (FOV) of the event camera changes in a manner dictated by the relative movement of the vehicular event camera relative to the scene forward of the vehicle being viewed.

Various sensors on the vehicle (e.g., steering sensors/yaw rate sensors/speed sensors) can determine the kinematic movement of the vehicle, and this kinematic data arising from movement of the vehicle combined with data relating to responses of the individual pixels of the multi-pixel vehicular event camera can be processed at a data processor of the vehicle to construct images of objects viewed by the multi-pixel vehicular event camera.

Knowing the vehicle kinematics and the response of individual pixels of the multi-pixel vehicular event camera, the data processor determines the rate at which objects in the field of view (FOV) of the vehicular event camera are moving through the vehicular event camera's FOV, with objects close to the vehicle changing position in the vehicular event camera's FOV more rapidly than do distant objects.

Not being a conventional frame camera (a 30 frame per second conventional camera take around 33 milliseconds to capture a frame of image data), the vehicular event camera can respond in microseconds. The vehicular event camera does not have a shutter. But, like a CMOS conventional camera, the vehicular event camera has a sensing array with hundreds of thousands of tiny, light-sensitive pixels or sensing elements. Each one of those pixels is programmed to record data under a simple set of conditions:

Did the amount of light received go up?
Did the amount of light received go down?
Did the amount of light received stay the same?

If either of the first two conditions occurs, that pixel transmits the new value. If the third condition occurs, it sends no new value. Each pixel in the vehicular event camera operates independently. That means that the vehicular event camera has microsecond (one millionth of a second) responsiveness. Moreover, the data that the vehicular event camera sends is, by default, compressed. Any pixel that doesn't register a change sends no value, just like a typical image compression algorithm. But those pixels that do send data can send a minuscule packet that barely even registers.

Thus, the vehicular event camera:
has no shutter and is always exposed to light;
is microsecond responsive; and
transfers negligible amounts of data continuously.

The manner in which the vehicular event camera works make it suitable in conditions that typically require high dynamic range cameras, such as rapid motion and low light.

The vehicular event camera disposed at the in-cabin side of the windshield and viewing through the windshield provides data for a machine vision system, such as a driving assistance system, such as traffic sign recognition, headlamp control, pedestrian detection, collision avoidance, lane marker detection and/or the like. For example, the data provided from the vehicular event camera may be processed to determine presence of a pedestrian or bicyclist or other vehicle ahead of the equipped vehicle. Data provided by the vehicular event camera may be fused with sensor data provided by other sensors of the vehicle, such as one or more radar sensors or lidar sensors disposed at the vehicle, and/or with vehicle data provided from sensors of the equipped vehicle that detect the likes of movement of the vehicle or geographical location of the equipped vehicle.

Thus, the vehicular event camera provides data that is output to the ECU for processing. The vehicular event camera comprises a multi-pixel photosensor array that has a field of view forward of the vehicle through the windshield of at least 52 degrees wide (horizontal FOV), preferably at least 100 degrees wide and more preferably at least 120 degrees wide, but most preferably is less than 160 degrees. The pixels of the vehicular event camera are arranged in rows and columns, with more columns than rows. The vehicular event camera may have greater than 640 columns of pixels and 480 rows of pixels, and may have at least 300,000 pixels, or at least 500,000 pixels, such as one million pixels or more (i.e., the vehicular event camera may be a megapixel vehicular event camera). The dynamic range of the vehicular event camera preferably is at least 100 dB, more preferably is at least 115 dB and most preferably is at least 125 dB. The response time of the vehicular event camera preferably is less than 10,000 microseconds, more preferably is less than 5,000 microseconds and most preferably is less than 1,000 microseconds.

The data output by the vehicular event camera is processed at the ECU to detect objects, such as pedestrians or cyclists or vehicles or the like. The data output by the vehicular event camera may be fused with a forward sensing radar sensor, such as a forward sensing imaging radar, or with a forward sensing lidar sensor, or the like. The vehicle kinematics may be provided as vehicle data from multiple sensors of the vehicle (e.g., a speed sensor, a steering angle sensor, a yaw sensor, a pitch sensor, a roll sensor and/or the like).

Optionally, the vehicular event camera may be provided for other exterior viewing applications, such as at the front or rear or sides of the vehicle, such as for use in an object detection system or parking assist system. Optionally, the vehicular event camera may have a field of view interior the vehicle, and may output data for a driver or occupant monitoring system of the vehicle.

Preferably, the vehicular event camera is used for a driver monitoring system such as is disclosed in PCT Publication WO 2022/187805 or in PCT Publication WO 2022/241423 or in PCT Application No. PCT/US2022/075887, filed Sep. 2, 2022, or in U.S. Publication No. US20220270409 or in U.S. Publication No. US20220114818 or in U.S. Pat. No. 11,348,374 or in U.S. Pat. No. 11,205,083 (which are all hereby incorporated herein by reference in their entireties).

For example, a vehicular interior rearview mirror assembly of the present invention includes a mirror head having an interior mirror reflective element such as is disclosed in PCT Publication WO 2022/187805, which is hereby incorporated herein by reference in its entirety. The mirror reflective element has a mirror transflector that transmits near-infrared (near-IR) light incident thereon, transmits visible light incident thereon and reflects visible light incident thereon. The mirror assembly includes an event camera disposed within the mirror head and viewing through the mirror transflector of the mirror reflective element. The event camera includes an imaging sensor having a quantum efficiency (QE) of at least 15% for near-infrared (near-IR) light having a wavelength of 940 nm (more preferred having a quantum efficiency (QE) of at least 20% for near-infrared (near-IR) light having a wavelength of 940 nm and most preferred having a quantum efficiency (QE) of at least 30% for near-infrared (near-IR) light having a wavelength of 940 nm). The mirror assembly further includes first, second and third near-IR illumination sources disposed within the mirror head and operable to emit near-infrared (near-IR) light that passes through the mirror transflector. The near-IR illumination sources are at respective angles relative to a planar front surface of the mirror reflective element and, when powered, illuminate respective in-cabin regions for a driver monitoring function or an occupant detection function.

Figure 2:
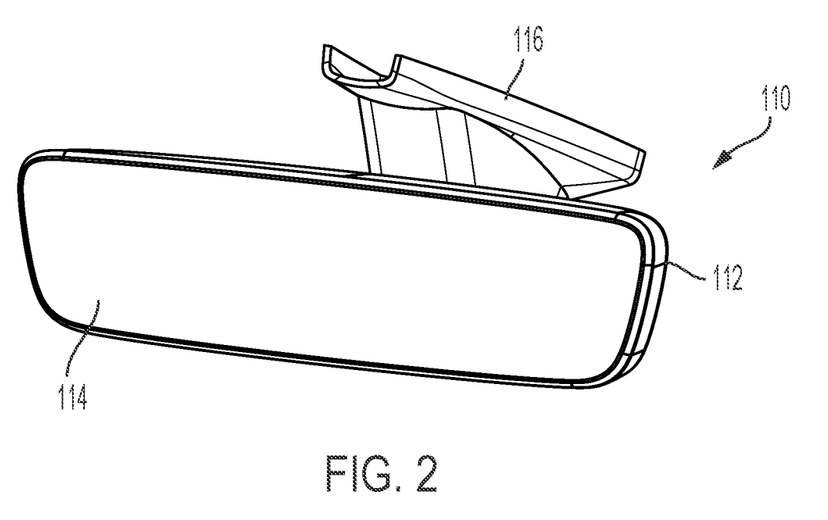
FIG. 2 is a perspective view of an interior rearview mirror assembly having a driver monitoring event camera and a near-infrared light emitter behind a reflective element of the interior rearview mirror assembly.

As shown in FIG. 2, in some implementations, an interior rearview mirror assembly 110 for a vehicle includes a casing 112 and a reflective element 114 positioned at a front portion of the casing 112. In the illustrated embodiment, the mirror assembly 110 is configured to be adjustably mounted to an interior portion of a vehicle (such as to an interior or in-cabin surface of a vehicle windshield or a headliner of a vehicle or the like) via a mounting structure or mounting configuration or assembly 116. The mirror reflective element may comprise a variable reflectance mirror reflective element that varies its reflectance responsive to electrical current applied to conductive coatings or layers of the reflective element.

Figure 3:
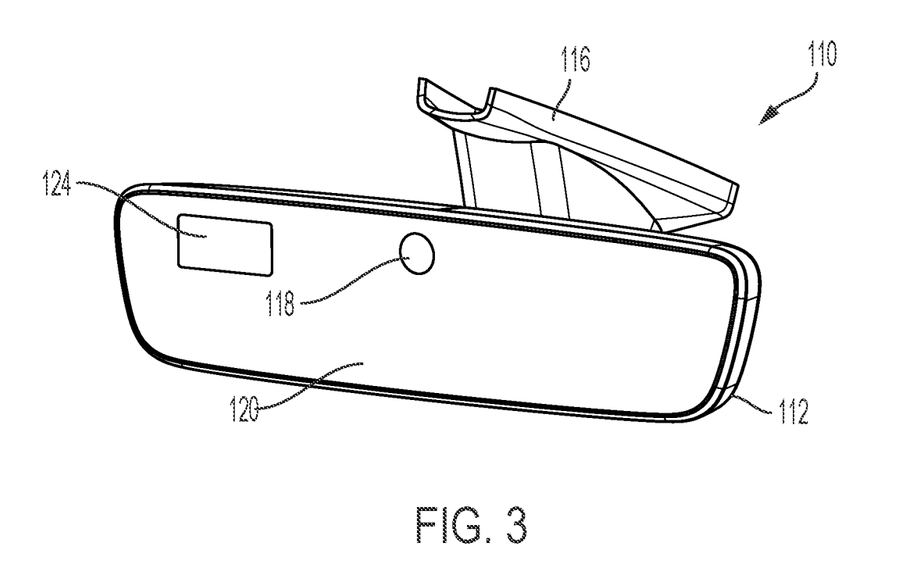
FIG. 3 is another perspective view of the interior rearview mirror assembly, showing the driver monitoring event camera and light emitters without the reflective element.

The mirror assembly 110 includes or is associated with a driver monitoring system (DMS), with the mirror assembly comprising a driver/occupant monitoring event camera 118 disposed at a back plate 120 (and viewing through an aperture of the back plate) behind the reflective element 114 and viewing through the reflective element toward at least a head region of the driver of the vehicle (FIG. 3). The DMS includes one or more infrared (IR) or near-infrared (near-IR or NIR) light emitter(s) 124, which may be disposed at the back plate 120 and may light through another aperture of the back plate and through the reflective element.

The mirror assembly 110 includes a printed circuit board (PCB) having a control or control unit comprising electronic circuitry (e.g., disposed at the circuit board or substrate in the mirror casing), which includes driver circuitry for controlling dimming of the mirror reflective element (for applications where the mirror reflective element comprises an electro-optic mirror reflective element, such as, for example, an electrochromic mirror reflective element). The circuit board (or a separate DMS circuit board) includes a processor that processes outputs of the event camera for monitoring the driver and determining, for example, driver attentiveness and/or driver drowsiness. The driver monitoring system includes the driver monitoring event camera 118 and may also include an occupant monitoring event camera (or the driver monitoring event camera may have a sufficiently wide field of view so as to view the occupant or passenger seat of the vehicle as well as the driver region), and may provide occupant detection and/or monitoring functions as part of an occupant monitoring system (OMS).

The mirror assembly may also include one or more light emitters (such as IR or NIR light emitting diodes (LEDs) or vertical-cavity surface-emitting lasers (VCSEL) or the like) disposed at the back plate 120 behind the reflective element 114 and emitting near-infrared light (or other nonvisible light) through the aperture of the back plate and through the reflective element toward the head region of the driver of the vehicle.

The interior rearview mirror thus may include embedded event cameras, IR/NIR illuminators and one or more processors for processing event camera outputs for the driver monitoring application. The inward facing event camera 118 and light emitters 124 may be fixed within the mirror head, and thus both components may be coupled with the mirror body. In these cases, the event camera's field of view is subject to change from driver to driver as the mirror head is adjusted to set the driver's preferred rearward view. Optionally, the event camera and light emitters may be disposed at the fixed (non-adjusting) mounting structure of the mirror assembly or may be disposed elsewhere in the cabin of the vehicle.

The event camera located at the interior rearview mirror, may be used for multiple functions. For example, the event camera may be used for a driver monitoring system and an occupant monitoring system. However, these different functionalities may have different lighting needs or requirements. For example, the functions may require different intensities of light, light directed in different directions, different frequencies of light, etc. Conventional systems may provide separate systems with redundant hardware to enable both functions, which increases costs.

The mirror assembly includes or is associated with a driver monitoring system (DMS), with the mirror assembly comprising the driver/occupant monitoring event camera 118 disposed at a back plate 120 (and viewing through an aperture of the back plate) behind the reflective element 114 and viewing through the reflective element toward at least a head region of the driver of the vehicle. The DMS includes a near-infrared light emitter 124 (or other nonvisible light emitter, such as an infrared light emitter) disposed at the back plate 120 and emitting light through another aperture of the back plate and through the reflective element.

With the DMS event camera disposed in the mirror head, the event camera moves with the mirror head (including the mirror casing and mirror reflective element that pivot at a pivot joint that pivotally connects the mirror head to the mounting structure of the interior rearview mirror assembly that in turn mounts at a windshield or at a headliner of the equipped vehicle), such that, when the driver aligns the mirror to view rearward, the event camera is aligned with the line of sight of the driver. The location of the DMS event camera and IR LED(s) at the mirror head provides an unobstructed view to the driver. The DMS preferably is self-contained in the interior rearview mirror assembly and thus may be readily implemented in a variety of vehicles, including existing vehicles and different models of the same vehicle brand (for example, in a BMW 3-series model and in a BMW X3 model and in a BMW 5-series model and in a BMW X5 model and in an BMW 7-series model, etc.). The driver monitoring event camera may also provide outputs for an occupancy monitoring system (OMS) or another separate event camera may be disposed at the mirror assembly for the OMS function.

Figure 4:
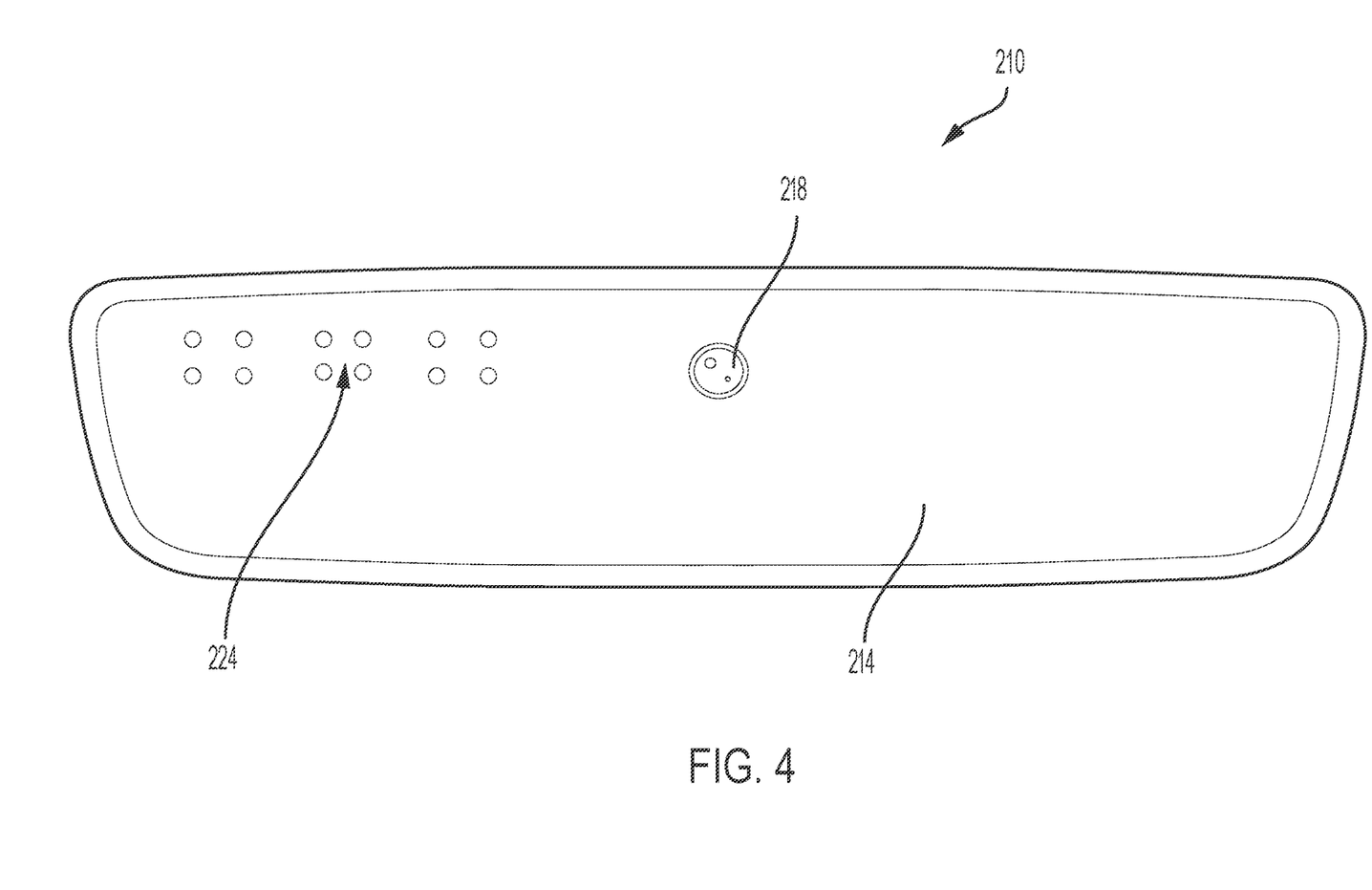
FIG. 4 is a plan view of the mirror head of the interior rearview mirror assembly.
Figure 5:
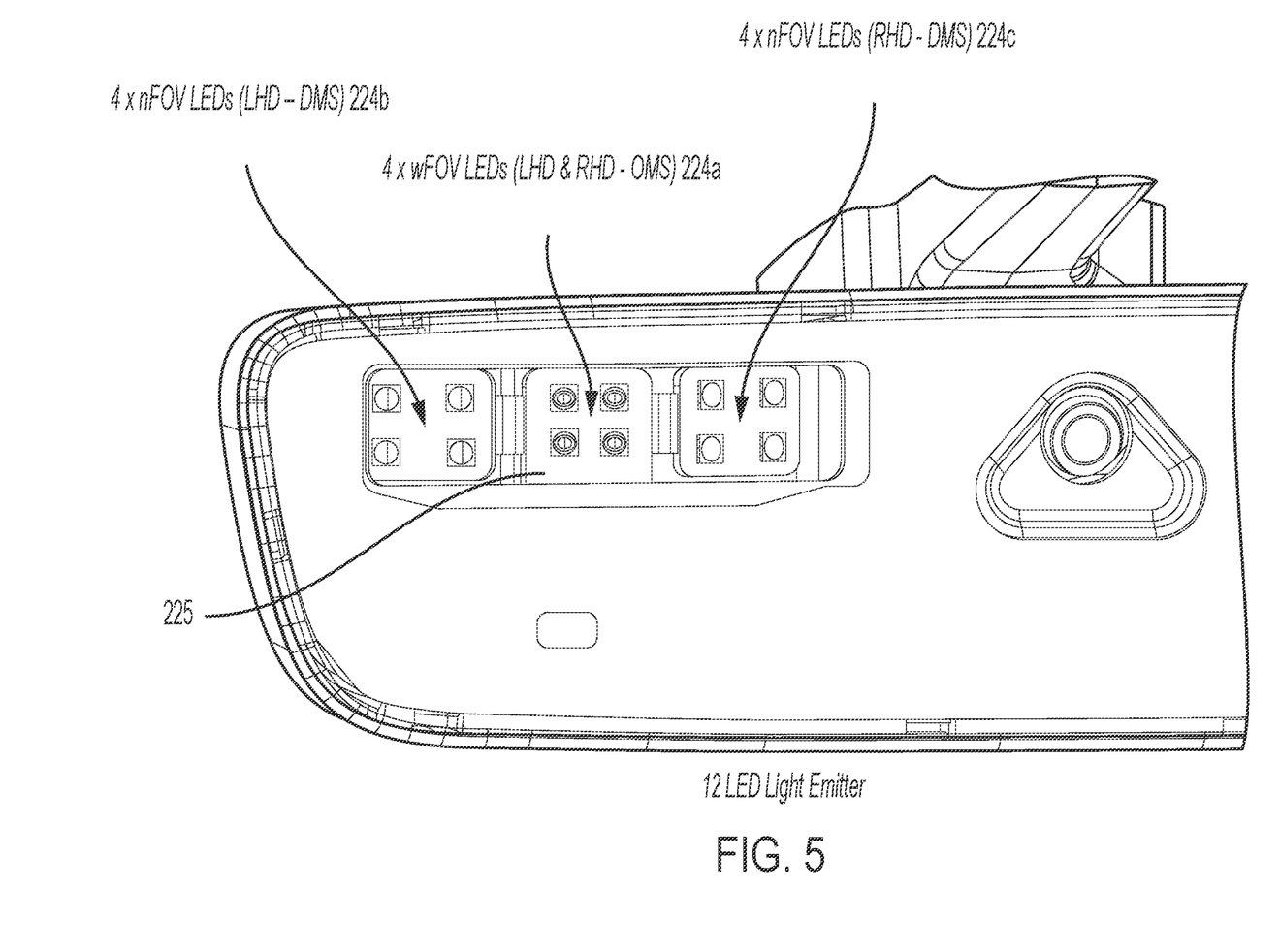
FIG. 5 is a plan view of the portion of the mirror head that accommodates the near-infrared light emitters, with two narrow beam emitters, one for illuminating a driver's head of a left hand drive vehicle and the other for illuminating a driver's head of a right hand drive vehicle.

The mirror assembly may also include one or more infrared (IR) or near-infrared light emitters 124 (such as IR or near-IR light emitting diodes (LEDs) or vertical-cavity surface-emitting lasers (VCSEL) or the like) disposed at the back plate 120 behind the reflective element 114 and emitting near-infrared light through the aperture of the back plate and through the reflective element toward the head region of the driver of the vehicle. As shown in FIGS. 4 and 5, the IR emitter device 124 comprises an IR emitter or LED printed circuit board, with a first set of near-infrared light emitting diodes 124a (e.g., a set of wider beam LEDs) at one part of the LED PCB and a second set of near-infrared light emitting diodes 124b (e.g., a set of narrower beam LEDs) at another part of the LED PCB. The LED PCB has one part angled relative to the other part to emit light in a desired direction depending on the orientation of the mirror head. Thus, the first set of near-infrared light emitting diodes may be angled toward the left side of the vehicle so as to be directed toward a driver of a left hand drive vehicle (if the mirror assembly is installed in a left hand drive vehicle and the first set of near-infrared light emitting diodes are enabled for the driver monitoring function), while the second set of near-infrared light emitting diodes may be angled toward the right side of the vehicle so as to be directed toward a driver of a right hand drive vehicle (if the mirror assembly is installed in a right hand drive vehicle and the second set of near-infrared light emitting diodes are enabled for the driver monitoring function).

Conventional driver monitoring systems (DMS) in likes of BMW, Ford, GM, Tesla, and Subaru vehicles (for example, for GM SuperCruise™ or for Ford's BlueCruise™ as described in https://www.consumerreports.org/car-safety/driver-monitoring-systems-ford-gm-earn-points-in-cr-tests-a6530426322) are "Two-Box" DMS in that (i) the conventional (non-event) camera used to monitor the driver's head/eyes and the near-IR emitting light sources that illuminate the driver's head/eyes are accommodated in a first box or module (that is usually located at the steering column of an equipped vehicle or in an overhead region of the equipped vehicle) and (ii) the electronics/software used to analyze camera outputs to determine the driver's gaze direction or head position or eye movement or alertness or drowsiness is accommodated in a separate second box or module that is located remote from and at a distance from the first box and that connects to the first box typically via a wired connection (the second box typically comprises an ECU that can be part of a head unit of the equipped vehicle and that besides DMS, optionally can provide other features).

The interior rearview mirror thus has an embedded event camera, IR illuminators and the processor for processing outputs of the event camera for the driver monitoring application. The inward facing event camera 118 and IR illuminators 124 are fixed within the mirror head, and thus both components are coupled with the mirror body. Hence, the event camera's field of view is subject to change from driver to driver as the mirror head is adjusted to set the driver's preferred rearward view. The light emitter 124 may have at least two sets of LEDs disposed on the circuit board. One set of LEDs emits a wider beam of near-infrared light when energized (e.g., four wider beam LEDs) and another set of LEDs emits a narrower beam of near-infrared light when energized (e.g., four narrower beam LEDs).

The narrow beam LEDs are angled or canted or biased (e.g., by ten degrees or thereabouts) toward the left and thus toward the driver of a left hand drive vehicle, while the wider beam LEDs are not biased toward either side. When the mirror assembly is installed in a left hand drive vehicle, the narrow beam LEDs illuminate the driver's head region while the wider beam LEDs illuminate the passenger area as well as the driver area. However, when the mirror assembly is installed in a right hand drive vehicle, the narrow beam LEDs do not illuminate the driver's head region while the wider beam LEDs illuminate the passenger area as well as the driver area.

The mirror assembly may include a near-infrared light emitter that is configured and operable to selectively emit light toward the driver head region when the mirror assembly is disposed in a left hand drive vehicle (with the driver sitting in a left side driver seat) or when the mirror assembly is disposed in a right hand drive vehicle (with the driver sitting in a right side driver seat). The system provides for DMS/OMS illumination that is software configurable based on vehicle data for the country code. For example, the DMS light emitters may comprise two or three separate banks/groups/sets of emitters or LEDs. One group is aimed or angled toward the left hand side of the vehicle and one group is aimed or angled toward the right hand side of the vehicle. Optionally, there is a third group that is aimed somewhere in between (in the illustrated examples discussed below, the third group is directed perpendicular to the mirror surface). These groups or sets can be made up of various combinations of wide and narrow LEDs or VCSELs.

Thus, the DMS light emitters are provided in a mirror assembly with two sets of narrow beam LEDs, one set that is for illuminating a driver of a left hand drive vehicle when the mirror assembly is installed in the left hand drive vehicle, and another set that is for illuminating a driver of a right hand drive vehicle when the mirror assembly is installed in the right hand drive vehicle. For example, and with reference to FIGS. 4 and 5, the mirror assembly 210 includes the event camera 218 and near-IR light emitters 224 disposed behind the mirror reflective element 214 and at the left side of center of the mirror head. The near-IR light emitters include three sets of LEDs (e.g., each set having four LEDs), including a wider beam set of LEDs 224a disposed between a first narrow beam set of LEDs 224b and a second narrow beam set of LEDs 224c. The wider beam set of LEDs 224a is centrally located at the light emitter PCB 225 and has no bias in either direction (i.e., its principal beam axis is generally normal to the planar surface of the mirror reflective element and with the beam providing greater than 100 degrees of illumination across the interior cabin, such as greater than 120 degrees of illumination across the interior cabin, such as greater than 150 degrees of illumination across the interior cabin), while the first narrow beam set of LEDs 224b is disposed at the left side of the wider set and is biased (e.g., canted or angled at about 0 to 20 degrees, preferably 5 to 15 degrees, such as, for example, 10 degrees) toward the left side, and the second narrow beam set of LEDs 224c is disposed at the right side of the wider set and is biased (e.g., canted or angled at about 10 to 30 degrees, preferably 15 to 25 degrees, such as, for example, 20 degrees or 22 degrees) toward the right side (and with each narrow beam set providing less than 100 degrees of illumination across the interior cabin, such as less than 80 degrees of illumination across the interior cabin, such as less than 60 degrees of illumination across the interior cabin). The light emitter circuit board 225 may comprise three parts, with the center part being parallel to the planar surface of the reflective element and with the side parts being angled or canted relative to the center part and relative to the planar surface of the reflective element to provide the desired or selected angling of the principal beam axis of the narrow beam set of LEDs. For applications where the light emitters are disposed at the right side of center of the mirror head, the angles of the narrow beam emitting light emitters would be reversed, so that the first narrow beam set of LEDs disposed at the left side of the wider set is biased (e.g., canted or angled at about 10 to 30 degrees, preferably 15 to 25 degrees, such as, for example, 20 degrees or 22 degrees) toward the left side, and the second narrow beam set of LEDs disposed at the right side of the wider set is biased (e.g., canted or angled at about 0 to 20 degrees, preferably 5 to 15 degrees, such as, for example, 10 degrees) toward the right side (and with each narrow beam set providing less than 100 degrees of illumination across the interior cabin, such as less than 80 degrees of illumination across the interior cabin, such as less than 60 degrees of illumination across the interior cabin).

Thus, when the mirror assembly is disposed in a left hand drive vehicle, the system is set so that the driver monitoring LEDs (that are energized when the event camera is operating for the driver monitoring function) comprise the first narrow beam set of LEDs 224b, such that the driver's head is illuminated by the near-infrared illumination emitted by the LEDs 224b during image capture for the driver monitoring function. Similarly, when the mirror assembly is disposed in a right hand drive vehicle, the system is set so that the driver monitoring LEDs comprise the second narrow beam set of LEDs 224b, such that the driver's head is illuminated by the near-infrared illumination emitted by the LEDs 224b during image capture for the driver monitoring function. The wider beam set of LEDs is the same for either the left hand drive application or right hand drive application and provides wider illumination during image capture for the occupant monitoring function.

The mirror reflective element sub-assembly transmits near-infrared light and reflects visible light. Thus, the mirror reflective element (i.e., a transflective mirror reflector or transflector of the mirror reflective element) effectively allows the IR emitters to emit light through the reflective element and allows the event camera to 'view' through the mirror reflective element, while allowing the mirror reflective element to reflect at least some visible light incident thereat to serve its intended rear viewing purpose. The IR emitters may be activated responsive at least in part to an ambient light level within the vehicle cabin and at the driver's head region, with the light level being determined by a light sensor or by processing outputs of the driver monitoring event camera. Although shown and described as being disposed behind the mirror reflective element and emitting light through and receiving light through the mirror reflective element, the light emitters and event camera may be disposed at a lower region of the mirror head (with the mounting base attached at the interior portion of the left hand drive vehicle or the right hand drive vehicle) and below the mirror reflective element and movable in tandem with the mirror head.

As can be seen in FIGS. 3 and 4, the driver monitoring event camera is centrally located in the mirror head. The nFOV near-IR LEDs that, in a RHD vehicle, monitor the driver's head, are positioned towards one lateral side of the mirror head and are angled [relative to the plane of the rear side of the rear glass surface of the EC Cell (its fourth surface)] at an acute angle around 10 degrees and view in a direction away from the lateral side of the mirror head. The nFOV near-IR LEDs that, in a LHD vehicle, illuminate the driver's head, are positioned closer to the central region of the mirror head (where the driver-monitoring event camera is disposed) and are angled [relative to the plane of the rear side of the rear glass surface of the EC Cell (its fourth surface)] at an acute angle around 20 degrees and view in a direction opposite to that of the other nFOV LEDs. The wFOV near-IR LEDs that provide general cabin/occupant illumination are disposed in the mirror head between where the nFOV LEDs are located—and have their principal axis of view perpendicular to the plane of the rear side of the rear glass planar surface of the EC Cell.

For a left hand drive vehicle equipped with the One-Box Interior DMS Rearview Mirror Assembly, during DMS operation of the event camera (for a driver monitoring function), the LHD nFOV light source (preferably a plurality of near-IR emitting LEDs comprising at least two LEDs and more preferably comprising four or less LEDs) and the wFOV light source (preferably a plurality of near-IR emitting LEDs comprising at least two LEDs and more preferably comprising four or less LEDs) are energized. The illumination provided by the LHD nFOV light source and the wFOV light source combine to illuminate the head region of the driver (who is seated at the left side of the vehicle) with an irradiance of at least 1.25 $W/m^2$, more preferably at least 1.8 $W/m^2$ and most preferably at least 2.3 $W/m^2$. The LHD nFOV near-IR light source has a narrow field of illumination cone/zone that encompasses/illuminates the driver's head-box region (and thus provides enhanced irradiance at the driver's face. The wFOV near-IR light source is also energized during operation of the event camera for the driver monitoring function, but the LHD nFOV near-IR light source is not energized. This selective energizing of one but not the other of the LHD and RHD light sources (taking a LHD drive as illustrative where the LHD light source is energized but the RHD light source is not energized) avoids wastefully generating heat within the mirror head by energizing the RHD light source that contributes scant illumination of the driver sitting in the left-hand driver's seat. The wFOV light source however adds some level of irradiance to the driver's head box region and also illuminates the area where the driver's hands would be (the steering wheel, center console, etc.) and thus regardless of whether in a LDH or a RHD vehicle, the wFOV light source is energized all the time the vehicle is powered and operated. Thus, for DMS operation of the event camera in a left hand drive vehicle, the One-Box Interior DMS Rearview Mirror Assembly will only power the LHD nFOV light source and the wFOV light source since these are the light sources that will illuminate the driver of the left hand drive vehicle. Light emitted by the RHD nFOV light source, when powered, does not cover in any significance any part of the LH driver so the RHD nFOV light source is not powered during DMS operation of the event camera in a LHD vehicle. Of course in a RHD vehicle, this reverses. For DMS operation of the event camera in a right hand drive vehicle, the One-Box Interior DMS Rearview Mirror Assembly will only power the RHD nFOV light source and the wFOV light source since these are the light sources that will illuminate the driver of the right hand drive vehicle.

For either a left hand drive vehicle or a right hand drive equipped with the One-Box Interior DMS Rearview Mirror Assembly, during operation of the event camera, all three sets of near-IR light sources (LHD nFOV and wFOV and RHD nFOV) are energized so that near-IR floodlighting within the vehicle cabin is maximized, and especially to illuminate likes of a second row of rear seats or even a third row of rear seats.

For the left hand drive vehicle equipped with the One-Box Interior DMS Rearview Mirror Assembly, during cap operation of the event camera (for an occupant monitoring or occupant detection function), the LHD nFOV light source, the wFOV light source and the RHD nFOV light source (preferably a plurality of near-IR emitting LEDs comprising at least two LEDs and more preferably comprising four or less LEDs) are all energized. The illumination provided by the LHD nFOV light source, the wFOV light source and the RHD nFOV light source combine to illuminate the second row or rear seats and the passenger seat region with an irradiance of at least 0.1 $W/m^2$, of preferably at least 0.15 $W/m^2$, and more preferably at least 0.2 $W/m^2$, and the illumination provided by the wFOV light source and the RHD nFOV light source combine to illuminate the front passenger seat region with an irradiance of at least 0.15 $W/m^2$, of preferably at least 0.25 $W/m^2$, and more preferably at least 0.4 $W/m^2$.

Thus, for DMS operation of the event camera in a left hand drive vehicle, the One-Box Interior DMS Rearview Mirror Assembly will only power the LHD nFOV light source and the wFOV light source since these are the light sources that will illuminate the driver of the left hand drive vehicle, and for OMS operation of the event camera in the left hand drive vehicle, the One-Box Interior DMS Rearview Mirror Assembly will power the LHD nFOV light source, the wFOV light source and the RHD nFOV light source.

Similarly, for a right hand drive vehicle equipped with the One-Box Interior DMS Rearview Mirror Assembly, during operation of the event camera (for a driver monitoring function), the RHD nFOV light source (preferably a plurality of near-IR emitting LEDs comprising at least two LEDs and more preferably comprising four or less LEDs) and the wFOV light source (preferably a plurality of near-IR emitting LEDs comprising at least two LEDs and more preferably comprising four or less LEDs) are energized. The illumination provided by the RHD nFOV light source and the wFOV light source combine to illuminate the head region of the driver (at the right side of the vehicle) with an irradiance of at least 1.25 W/m$^2$, more preferably at least 1.8 W/m$^2$ and most preferably at least 2.3 W/m$^2$. The RHD nFOV light source has a narrow field of illumination cone that covers the driver's head box region (and thus provides enhanced irradiance at the driver's face without increasing the input power to the RHD nFOV light source, while also providing reduced heat generation in the system and reducing the number of LEDs needed), while the wFOV light source adds some level of irradiance to the driver's head box region but also illuminates the area where the driver's hands would be (the steering wheel, center console, etc.). Thus, for DMS operation of the event camera in a right hand drive vehicle, the One-Box Interior DMS Rearview Mirror Assembly will only power the RHD nFOV light source and the wFOV light source since these are the light sources that will illuminate the driver of the right hand drive vehicle. Light emitted by the LHD nFOV light source, when powered, does not cover any part of the RH driver so the LHD nFOV light source is not powered during DMS operation of the event camera.

For the right hand drive vehicle equipped with the One-Box Interior DMS Rearview Mirror Assembly, during OMS operation of the event camera (for an occupant monitoring or occupant detection function), the RHD nFOV light source, the wFOV light source and the LHD nFOV light source (preferably a plurality of near-IR emitting LEDs comprising at least two LEDs and more preferably comprising four or less LEDs) are all energized. The illumination provided by the RHD nFOV light source, the wFOV light source and the LHD nFOV light source combine to illuminate the second row or rear seats and the passenger seat region with an irradiance of at least 0.1 W/m$^2$, of preferably at least 0.15 W/m$^2$, and more preferably at least 0.2 W/m$^2$, and the illumination provided by the wFOV light source and the LHD nFOV light source combine to illuminate the front passenger seat region with an irradiance of at least 0.15 W/m$^2$, of preferably at least 0.25 W/m$^2$, and more preferably at least 0.4 W/m$^2$.

Thus, for DMS operation of the event camera in a right hand drive vehicle, the One-Box Interior DMS Rearview Mirror Assembly will only power the RHD nFOV light source and the wFOV light source since these are the light sources that will illuminate the driver of the right hand drive vehicle, and for OMS operation of the event camera in the right hand drive vehicle, the One-Box Interior DMS Rearview Mirror Assembly will power the RHD nFOV light source, the wFOV light source and the LHD nFOV light source.

The illumination protocols/scenarios described herein can be dynamic in that they can adjust to a current driving situation. For example, the illumination protocols can adjust for daytime/nighttime (by time of day or time of night) driving conditions; the illumination protocols can adjust responsive to a level of ambient cabin lighting, such as can occur on a sunny day vs cloudy day or at dawn or dusk; or the illumination protocols can adjust (such as for thermal management) to temporarily de-rate in-cabin illumination for a temporary limited period of time after ignition-on or start-up occurs when the vehicle has been parked out in the sun on a hot sunny day.

Whether the One-Box Interior DMS Rearview Mirror Assembly is disposed in a LHD vehicle or a RHD vehicle, for purposes of occupancy detection, preferably has a field of illumination that covers the seating positions (front and rear) of occupants of the vehicle. Similarly, to provide near-IR floodlighting of such passengers seated in the interior cabin of the vehicle, the field of illumination by the wFOV near-IR illuminator, whether the One-Box Interior DMS Rearview Mirror Assembly is used in a LHD or a RHD vehicle, covers the seating positions (front and rear) of occupants of the vehicle. However, for DMS functionality, it is desirable that the driver's face/head/body is near-IR illuminated as intensely as possible. Thus, for a LHD vehicle, it is desirable to have the LHD nFOV near-IR illuminator directed toward the driver of the LHD vehicle, while for a RHD vehicle, it is desirable to have the RHD nFOV near-IR illuminator directed toward the driver of the RHD vehicle. Given that the central area of the DMS mirror head has limited space to accommodate the event camera, a wFOV near-IR illuminator, an nFOV near-IR illuminator and the mirror pivot joint and similar/associated hardware, the nFOV near-IR illuminators, for practical reasons, are disposed to the left side of the event camera or to the right side of the event camera.

Optionally, for practical reasons, such as manufacturing and packaging and cost reasons, it can be desirable to have the nFOV near-IR illuminators on one side (e.g., the left side) or the other side (e.g., the right side) of the event camera centrally disposed in the mirror head or to have the LHD nFOV near-IR illuminator on one side (e.g., the left side) and the RHD nFOV near-IR illuminator on the other side (e.g., the right side). For example, a One-Box Interior DMS Rearview Mirror Assembly may have the event camera and the wFOV near-IR illuminator centrally disposed at the mirror head (with the event camera centrally located above or below the wFOV near-IR illuminator), with one of the nFOV near-IR illuminators (e.g., the LHD nFOV near-IR illuminator that is for illuminating the driver of a LHD vehicle) disposed at the left side of the mirror head (at the left side of the event camera) and the other of the nFOV near-IR illuminators (e.g., the RHD nFOV near-IR illuminator that is for illuminating the driver of a RHD vehicle) disposed at the right side of the mirror head (at the right side of the event camera). Alternatively, it is contemplated that the LHD nFOV near-IR illuminator may be disposed at the right side of the mirror head and the RHD nFOV near-IR illuminator may be disposed at the left side of the mirror head.

Optionally, the nFOV near-IR illuminators may be more centrally disposed in the mirror head (such as above or below the centrally located wFOV near-IR illuminator). For example, the wFOV near-IR illuminator may be centrally located (e.g., above or below the centrally located event camera), and the nFOV near-IR illuminators may be disposed at or above (or below) the wFOV near-IR illuminator. One of the nFOV near-IR illuminators (e.g., the LHD nFOV near-IR illuminator that is for illuminating the driver of a LHD vehicle) may be disposed at the left side of the centerline of the mirror head (at the left side of the event camera) and the other of the nFOV near-IR illuminators (e.g., the RHD nFOV near-IR illuminator that is for illuminating the driver of a RHD vehicle) is disposed at the right side of the centerline of the mirror head (at the right side of the event camera). Alternatively, it is contemplated that the LHD nFOV near-IR illuminator may be disposed at the right side of the centerline of the mirror head and the RHD nFOV near-IR illuminator may be disposed at the left side of the centerline of the mirror head. It is further contemplated that the LHD nFOV near-IR illuminator and the RHD nFOV near-IR illuminator may be vertically arranged at the centerline of the mirror head, with one above the other.

Optionally, the wFOV near-IR illuminator may be centrally disposed (e.g., above or below the centrally disposed event camera), and both nFOV near-IR illuminators may be disposed at one side or the other of the mirror head. For example, the wFOV near-IR illuminator is centrally disposed (e.g., above or below the centrally disposed event camera), and the LHD and RHD nFOV near-IR illuminators are disposed at the right side of the mirror head, with the LHD nFOV near-IR illuminator disposed closer to the center of the mirror head than the RHD nFOV near-IR illuminator. Alternatively, the wFOV near-IR illuminator is centrally disposed (e.g., above or below the centrally disposed event camera), and the LHD and RHD nFOV near-IR illuminators are disposed at the left side of the mirror head, with the RHD nFOV near-IR illuminator disposed closer to the center of the mirror head than the LHD nFOV near-IR illuminator. Optionally, the wFOV near-IR illuminator and/or the nFOV near-IR illuminators may be disposed at a lower region of the mirror head or may be disposed at an upper region of the mirror head. Thus, one or both of the nFOV near-IR illuminators may be higher up toward the upper region of the mirror head, and/or the wFOV near-IR illuminator may be higher up toward the upper region of the mirror head.

The near-IR signal emitted by the LEDs is preferably at 940 nm wavelength so that it is more readily recognized by the DMS processor (there is a decrease in ambient solar light at that wavelength due to absorption of 940 nm light by water in the atmosphere). The DMS event camera includes a filter that allows/passes that wavelength and attenuates other light. The event camera will thus operate with an enhanced 940 nm signal, which enhances driver monitoring in situations where the driver is wearing sunglasses. The rest of the in-cabin light (i.e., the ambient light) is filtered so the event camera focuses on the 940 nm wavelength and then avoids "seeing" reflection at sunglasses.

For example, the event camera may be disposed at an interior electrochromic rearview mirror assembly mounted at an in-cabin side of a windshield of a vehicle, wherein the event camera comprises a CMOS image sensor having a photosensor array that senses both visible light and near-infrared illumination. Preferably, supplemental sources of near-infrared illumination (such a near-IR emitting LRDs or near-IR emitting laser) are integrated into the interior electrochromic rearview mirror assembly that, when powered to emit near-infrared light, illuminate at least the driver-side front seating area within the interior cabin of the equipped vehicle. Preferably, presence of the event camera disposed behind the electrochromic mirror reflective element is not readily apparent to an occupant of the equipped vehicle. Most preferably, the event camera views through an electrochromic mirror reflective element of the interior electrochromic rearview mirror assembly. Preferably, a processor is disposed at the interior electrochromic rearview mirror assembly, the processor processing image data captured by the event camera. Preferably, the event camera at least (a) views a driver-side front seating area of the equipped vehicle and (b) views a passenger-side front seating area of the equipped vehicle, and via processing at the processor of image data captured by the event camera, the driver of the equipped vehicle is monitored.

Preferably, the interior electrochromic rearview mirror assembly is disposed at the in-cabin side of a windshield of the equipped vehicle equipped with the vehicular driver monitoring system, and wherein the interior electrochromic rearview mirror assembly comprises an electrochromic mirror reflective element comprises a front glass substrate and a rear glass substrate with an electrochromic medium sandwiched therebetween, and wherein the front glass substrate comprises a planar first side and a planar second side separated by a thickness of the front glass substrate, and wherein a transparent electrically conductive coating is disposed at the planar second side of the front glass substrate, and wherein the rear glass substrate comprises a planar third side and a planar fourth side separated by a thickness of the rear glass substrate, and wherein a mirror reflector is disposed at the planar third side of the rear glass substrate, and wherein an electrochromic medium is disposed in an interpane cavity between the planar second side of the front glass substrate and the planar third side of the rear glass substrate, and wherein the interpane cavity is established by a seal that spaces the planar second side of the front glass substrate from the planar third side of the rear glass substrate, and wherein the electrochromic medium contacts the transparent electrically conductive coating disposed at the planar second side of the front glass substrate and contacts the mirror reflector disposed at the planar third side of the rear glass substrate, and wherein a metallic perimeter band circumscribes a perimeter border region of the planar second side of the front glass substrate of the electrochromic mirror reflective element, the metallic perimeter band masking the seal, that spaces the planar second side of the front glass substrate from the planar third side of the rear glass substrate, from view by a driver of the equipped vehicle viewing the electrochromic mirror reflective element when seated within an interior cabin of the equipped vehicle at a driver-side front seating area of the equipped vehicle, and wherein the interior electrochromic rearview mirror assembly comprises a mirror casing, and wherein a circumferential perimeter glass edge circumscribes a periphery of the front glass substrate of the electrochromic mirror reflective element, the circumferential perimeter glass edge spanning a thickness dimension of the front glass substrate separating the planar first side from the planar second side, and wherein no portion of the mirror casing overlaps the planar first side of the front glass substrate of the electrochromic mirror reflective element, and wherein no part of the rear glass substrate extends beyond any part of the front glass substrate.

The vehicular event camera may utilize aspects of the event cameras and systems described in U.S. Pat. Nos. 11,202,041; 11,190,715; 11,176,367; 11,151,739; 11,150,469; 11,019,273; 10,992,887; 10,845,601; 10,466,779; 10,447,920 and/or 10,237,481, which are all hereby incorporated herein by reference in their entireties.

The system includes a data processor operable to process the data output by the vehicular event camera or event cameras, such as for detecting objects or vehicles or pedestrians or the like in the field of view of one or more of the vehicular event cameras. For example, the processor may utilize aspects of a processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze data to detect vehicles and/or other objects. Responsive to such processing, and when an object or other vehicle is detected, the system may control steering and/or braking of the vehicle and/or may generate an alert to the driver of the vehicle and/or may generate an overlay at a displayed image to highlight or enhance display of the detected object or vehicle, in order to enhance the driver's awareness of the detected object or vehicle or hazardous condition during a driving maneuver of the equipped vehicle.

The vehicle may also include any type of sensor or sensors, such as conventional imaging sensors or radar sensors or lidar sensors or ultrasonic sensors or the like. The event camera may capture data for data processing and may comprise any suitable event camera or sensing device, such as, for example, a two dimensional array of a plurality of photosensor elements arranged in at least 640 columns and 480 rows (at least a 640×480 imaging array, such as a megapixel photosensor array or the like), with a respective lens focusing light onto respective portions of the array. The photosensor array may comprise a plurality of photosensor elements arranged in a photosensor array having rows and columns. The photosensing array may comprise a CMOS photosensing array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The logic and control circuit of the photosensing array of the vehicular event camera may function in any known manner, and the image processing and algorithmic processing may comprise any suitable means for processing the images and/or image data.

For example, the vision system and/or processing and/or event camera and/or circuitry may utilize aspects described in U.S. Pat. Nos. 10,099,614; 10,071,687; 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The device and control and processor and any associated illumination source, if applicable, may comprise any suitable components, and may utilize aspects of the vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Optionally, the event camera may comprise a forward viewing vehicular event camera, such as disposed at a windshield electronics module (WEM) or the like. The forward viewing vehicular event camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

The event camera module and circuit chip or board and sensor may be implemented and operated in connection with various vehicular ADAS systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle ADAS system, such as a forward, sideward or rearward directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268; 7,370,983; 7,937,667 and/or 9,800,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S.

Pat. Nos. 6,396,397 and/or 7,123,168, which are hereby incorporated herein by reference in their entireties, and/or the like.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,552,976; 10,532,698; 10,160,382; 10,086,870; 9,558,409; 9,446,713; 9,085,261 and/or 6,690,268, and/or U.S. Publication Nos. US-2022-0189052; US-2022-0028111; US-2022-0027644; US-2022-0024391; US-2021-0170947; US-2021-0170820; US-2021-0078634; US-2020-0406967; US-2020-0361397; US-2020-0356788; US-2020-0334475; US-2020-0017143; US-2019-0347825; US-2019-0118860; US-2019-0064831; US-2018-0276838; US-2018-0215382; US-2017-0254873; US-2017-0217372 and/or US-2015-0002670, and/or International Publication No. WO 2021/0127693, which are all hereby incorporated herein by reference in their entireties.

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision event cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system thus may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 10,819,943; 9,555,736; 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,518,401; 10,065,574; 10,017,114; 9,405,120 and/or 7,914,187, and/or U.S. Publication Nos. US-2021-0323473; US-2021-0291739; US-2020-0202151; US-2020-0143560; US-2020-0320320; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2022/241423 and/or WO 2022/187805, and/or International PCT Application No. PCT/US2022/075887, filed Sep. 2, 2022, which are hereby incorporated herein by reference in their entireties.

Optionally, the driver monitoring system may be integrated with a rearward monitoring system of the vehicle. The integrated vehicle system incorporates multiple inputs, such as from the inward viewing or driver monitoring event camera and from the forward or outward viewing event camera, as well as from a rearward viewing event camera and sideward viewing event cameras of the rearward monitoring system, to provide the driver with unique collision mitigation capabilities based on full vehicle environment and driver awareness state.

The ECU may receive data output by a plurality of event cameras of the vehicle. The ECU may comprise a central or single ECU that processes data output by the event cameras for a plurality of driving assist functions. The system may utilize aspects of the systems described in U.S. Pat. Nos. 10,442,360 and/or 10,046,706, and/or U.S. Publication Nos. US-2021-0245662; US-2021-0162926; US-2021-0155167 and/or US-2019-0118717, and/or International Publication No. WO 2022/150826, which are all hereby incorporated herein by reference in their entireties.

Optionally, the system may include a display for displaying images captured by one or more imaging sensors for viewing by the driver of the vehicle while the driver is normally operating the vehicle. Optionally, for example, the system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the system (utilizing the forward viewing event camera and a rearward viewing event camera and other event cameras disposed at the vehicle with exterior fields of view) may be part of or may provide a display of a top-down view or bird's-eye view system of the vehicle or a surround view at the vehicle, such as by utilizing aspects of the vision systems described in U.S. Pat. Nos. 10,071,687; 9,900,522; 9,834,153; 9,762,880; 9,596,387; 9,264,672; 9,126,525 and/or 9,041,806, and/or U.S. Publication No. US-2015-0022664, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising: an event camera disposed in a cabin of a vehicle equipped with the vehicular driver monitoring system, the event camera viewing the head of a driver of the equipped vehicle; the event camera comprising a photosensing array having photosensor pixels arranged in rows and columns; wherein the dynamic range of the event camera is at least 100 dB; wherein the response time of the event camera is less than 10,000 microseconds; wherein the event camera has a quantum efficiency (QE) of at least 15% for near-infrared (near-IR) light having a wavelength of 940 nm; an electronic control unit (ECU) comprising electronic circuitry and associated software; wherein data output by the event camera is provided to the ECU; wherein the electronic circuitry of the ECU comprises a processor for processing data output by the event camera and provided to the ECU; wherein the vehicular driver monitoring system, responsive to processing at the ECU of data output by the event camera and provided to the ECU, monitors the driver of the equipped vehicle; wherein vehicle kinematic data is provided to the ECU as the equipped vehicle is driven along a road; wherein the vehicle kinematic data provided to the ECU comprises at least one data selected from the group consisting of (i) speed data, (ii) steering angle data, (iii) yaw data, (iv) pitch data and (v) roll data; and wherein, responsive at least in part to monitoring of the driver of the equipped vehicle and responsive at least in part to the vehicle kinematic data provided to the ECU, at least one is selected from the group consisting of (i) a driver attentiveness alert is generated, (ii) a driver drowsiness alert is generated, (iii) steering of the equipped vehicle is controlled and (iv) braking of the equipped vehicle is controlled.

2. The vehicular driver monitoring system of claim 1, wherein the data output by the event camera is fused with data provided to the ECU from at least one other sensor of the equipped vehicle.

3. The vehicular driver monitoring system of claim 2, wherein the at least one other sensor comprises a radar sensor disposed at the equipped vehicle.

4. The vehicular driver monitoring system of claim 2, wherein the at least one other sensor comprises a lidar sensor disposed at the equipped vehicle.

5. The vehicular driver monitoring system of claim 1, wherein the event camera is disposed at an in-cabin side of a windshield of the equipped vehicle.

6. The vehicular driver monitoring system of claim 5, wherein the event camera is disposed at an interior rearview mirror assembly of the equipped vehicle.

7. The vehicular driver monitoring system of claim 6, wherein the interior rearview mirror assembly includes a mirror head that is adjustably disposed at a mounting base that is configured to attach the interior rearview mirror assembly at the in-cabin side of the windshield of the equipped vehicle, the mirror head having a mirror reflective element.

8. The vehicular driver monitoring system of claim 7, wherein the event camera is disposed within the mirror head.

9. The vehicular driver monitoring system of claim 8, wherein the event camera views through the mirror reflective element of the mirror head.

10. The vehicular driver monitoring system of claim 9, wherein the mirror reflective element comprises a mirror transflector, and wherein the mirror transflector transmits near-infrared (near-IR) light incident thereon, transmits visible light incident thereon and reflects visible light incident thereon.

11. The vehicular driver monitoring system of claim 10, wherein the event camera views through the mirror transflector of the mirror reflective element of the mirror head.

12. The vehicular driver monitoring system of claim 11, wherein the event camera is covertly disposed behind the mirror transflector of the mirror reflective element of the mirror head.

13. The vehicular driver monitoring system of claim 11, comprising an illumination source disposed within the mirror head and operable to emit light that passes through the mirror transflector of the mirror reflective element to illuminate the head of the driver of the equipped vehicle.

14. The vehicular driver monitoring system of claim 13, wherein the illumination source, when operated to emit light, emits near-infrared (near-IR) light.

15. The vehicular driver monitoring system of claim 7, wherein the ECU is disposed at the interior rearview mirror assembly.

16. The vehicular driver monitoring system of claim 15, wherein the ECU is disposed within the mirror head of at the interior rearview mirror assembly.

17. The vehicular driver monitoring system of claim 1, comprising an illumination source operable to emit light to illuminate the head of the driver of the equipped vehicle.

18. The vehicular driver monitoring system of claim 17, wherein the illumination source, when operated to emit light, emits near-infrared (near-IR) light.

19. The vehicular driver monitoring system of claim 18, wherein the event camera comprises a photosensing array having at least one million photosensor pixels arranged in rows and columns.

20. The vehicular driver monitoring system of claim 18, wherein the event camera has a quantum efficiency (QE) of at least 20% for near-infrared (near-IR) light having a wavelength of 940 nm.

21. The vehicular driver monitoring system of claim 18, wherein the event camera has a quantum efficiency (QE) of at least 30% for near-infrared (near-IR) light having a wavelength of 940 nm.

22. A vehicular driver monitoring system, the vehicular driver monitoring system comprising: an event camera disposed in an interior rearview mirror assembly attached at an in-cabin side of a windshield of a vehicle equipped with the vehicular driver monitoring system, the event camera viewing the head of a driver of the equipped vehicle; the event camera comprising a photosensing array having photosensor pixels arranged in rows and columns; wherein the dynamic range of the event camera is at least 100 dB; wherein the response time of the event camera is less than 10,000 microseconds; wherein the event camera has a quantum efficiency (QE) of at least 15% for near-infrared (near-IR) light having a wavelength of 940 nm; wherein the interior rearview mirror assembly includes a mirror head that is adjustably disposed at a mounting base that is configured to attach the interior rearview mirror assembly at the in-cabin side of the windshield of the equipped vehicle, the mirror head having a mirror reflective element; wherein the event camera is disposed within the mirror head; wherein the interior rearview mirror assembly includes a plurality of near-IR illumination sources operable to emit near-infrared (near-IR) light to illuminate the head of the driver of the equipped vehicle; an electronic control unit (ECU) comprising electronic circuitry and associated software; wherein data output by the event camera is provided to the ECU; wherein the electronic circuitry of the ECU comprises a processor for processing data output by the event camera and provided to the ECU; wherein the vehicular driver monitoring system, responsive to processing at the ECU of data output by the event camera and provided to the ECU, monitors the driver of the equipped vehicle; wherein vehicle kinematic data is provided to the ECU as the equipped vehicle is driven along a road; wherein the vehicle kinematic data provided to the ECU comprises at least one data selected from the group consisting of (i) speed data, (ii) steering angle data, (iii) yaw data, (iv) pitch data and (v) roll data; and wherein, responsive at least in part to monitoring of the driver of the equipped vehicle and responsive at least in part to the vehicle kinematic data provided to the ECU, at least one is selected from the group consisting of (i) a driver attentiveness alert is generated, (ii) a driver drowsiness alert is generated, (iii) steering of the equipped vehicle is controlled and (iv) braking of the equipped vehicle is controlled.

23. The vehicular driver monitoring system of claim 22, wherein the mirror reflective element comprises a mirror transflector, and wherein the mirror transflector transmits near-infrared (near-IR) light incident thereon, transmits visible light incident thereon and reflects visible light incident thereon.

24. The vehicular driver monitoring system of claim 23, wherein the event camera views through the mirror transflector of the mirror reflective element.

25. The vehicular driver monitoring system of claim 23, wherein the illumination sources of the plurality of near-IR illumination sources, when operated, emit near-infrared (near-IR) light that passes through the mirror transflector of the mirror reflective element.

26. The vehicular driver monitoring system of claim 23, wherein the event camera is covertly disposed behind the mirror transflector of the mirror reflective element of the mirror head, and wherein the illumination sources of the plurality of near-IR illumination sources, when not operated, are covertly disposed behind the mirror transflector of the mirror reflective element.

27. The vehicular driver monitoring system of claim 26, wherein the event camera has a quantum efficiency (QE) of at least 20% for near-infrared (near-IR) light having a wavelength of 940 nm.

28. The vehicular driver monitoring system of claim 26, wherein the event camera has a quantum efficiency (QE) of at least 30% for near-infrared (near-IR) light having a wavelength of 940 nm.

29. A vehicular driver monitoring system, the vehicular driver monitoring system comprising: an event camera disposed in an interior electrochromic rearview mirror assembly attached at an in-cabin side of a windshield of a vehicle equipped with the vehicular driver monitoring system, the event camera viewing the head of a driver of the equipped vehicle; the event camera comprising a photosensing array having photosensor pixels arranged in rows and columns; wherein the dynamic range of the event camera is at least 100 dB; wherein the response time of the event camera is less than 10,000 microseconds; wherein the event camera has a quantum efficiency (QE) of at least 15% for near-infrared (near-IR) light having a wavelength of 940 nm; wherein the interior electrochromic rearview mirror assembly includes a mirror head that is adjustably disposed at a mounting base that is configured to attach the interior electrochromic rearview mirror assembly at the in-cabin side of the windshield of the equipped vehicle, the mirror head having an electrochromic mirror reflective element; wherein the electrochromic mirror reflective element comprises a front glass substrate and a rear glass substrate with an electrochromic medium sandwiched therebetween; wherein the front glass substrate comprises a planar first side and a planar second side separated by a thickness of the front glass substrate, and wherein a transparent electrically conductive coating is disposed at the planar second side of the front glass substrate; wherein the rear glass substrate comprises a planar third side and a planar fourth side separated by a thickness of the rear glass substrate, and wherein a mirror transflector is disposed at the planar third side of the rear glass substrate; wherein an electrochromic medium is disposed in an interpane cavity between the planar second side of the front glass substrate and the planar third side of the rear glass substrate; wherein the interpane cavity is established by a seal that spaces the planar second side of the front glass substrate from the planar third side of the rear glass substrate; wherein the electrochromic medium contacts the transparent electrically conductive coating disposed at the planar second side of the front glass substrate and contacts the mirror transflector disposed at the planar third side of the rear glass substrate; wherein the mirror transflector transmits near-infrared (near-IR) light incident thereon, transmits visible light incident thereon and reflects visible light incident thereon; wherein the event camera is covertly disposed behind the mirror transflector of the electrochromic mirror reflective element of the mirror head; wherein the event camera views through the mirror transflector of the electrochromic mirror reflective element; wherein the event camera is disposed within the mirror head; wherein the interior electrochromic rearview mirror assembly includes a plurality of near-IR light emitting diodes (LEDs) operable to emit near-infrared (near-IR) light to illuminate the head of the driver of the equipped vehicle; wherein the LEDs of the plurality of near-IR LEDs, when not operated, are covertly disposed behind the mirror transflector of the electrochromic mirror reflective element; wherein the LEDs of the plurality of near-IR LEDs, when operated, emit near-infrared (near-IR) light that passes through the mirror transflector of the electrochromic mirror reflective element; an electronic control unit (ECU) comprising electronic circuitry and associated software; wherein data output by the event camera is provided to the ECU; wherein the ECU is disposed with the mirror head of the interior electrochromic rearview mirror assembly; wherein the electronic circuitry of the ECU comprises a processor for processing data output by the event camera and provided to the ECU; wherein the vehicular driver monitoring system, responsive to processing at the ECU of data output by the event camera and provided to the ECU, monitors the driver of the equipped vehicle; wherein vehicle kinematic data is provided to the ECU as the equipped vehicle is driven along a road; wherein the vehicle kinematic data provided to the ECU comprises at least one data selected from the group consisting of (i) speed data, (ii) steering angle data, (iii) yaw data, (iv) pitch data and (v) roll data; and wherein, responsive at least in part to monitoring of the driver of the equipped vehicle and responsive at least in part to the vehicle kinematic data provided to the ECU, at least one is selected from the group consisting of (i) a driver attentiveness alert is generated, (ii) a driver drowsiness alert is generated, (iii) steering of the equipped vehicle is controlled and (iv) braking of the equipped vehicle is controlled.

30. The vehicular driver monitoring system of claim 29, wherein a metallic perimeter band circumscribes a perimeter border region of the planar second side of the front glass substrate of the electrochromic mirror reflective element, the metallic perimeter band masking the seal, that spaces the planar second side of the front glass substrate from the planar third side of the rear glass substrate, from view by the driver of the equipped vehicle viewing the electrochromic mirror reflective element when seated within an interior cabin of the equipped vehicle at a driver-side front seating area of the equipped vehicle.

31. The vehicular driver monitoring system of claim 30, wherein no part of the rear glass substrate extends beyond any part of the front glass substrate.

32. The vehicular driver monitoring system of claim 31, wherein the mirror head of the interior electrochromic rearview mirror assembly comprises a mirror casing, and wherein a circumferential perimeter glass edge circumscribes a periphery of the front glass substrate of the electrochromic mirror reflective element, the circumferential perimeter glass edge spanning a thickness dimension of the front glass substrate separating the planar first side from the planar second side, and wherein no portion of the mirror casing overlaps the planar first side of the front glass substrate of the electrochromic mirror reflective element.

33. The vehicular driver monitoring system of claim 32, wherein a portion of the mirror casing circumscribes the circumferential perimeter glass edge circumscribing the periphery of the front glass substrate of the electrochromic mirror reflective element.

34. The vehicular driver monitoring system of claim 33, wherein the electrochromic mirror reflective element nests in the mirror casing.

35. The vehicular driver monitoring system of claim 29, wherein the event camera has a quantum efficiency (QE) of at least 20% for near-infrared (near-IR) light having a wavelength of 940 nm.

36. The vehicular driver monitoring system of claim 29, wherein the event camera has a quantum efficiency (QE) of at least 30% for near-infrared (near-IR) light having a wavelength of 940 nm.

\* \* \* \* \*